US008197118B2

(12) United States Patent
Hudson et al.

(10) Patent No.: US 8,197,118 B2
(45) Date of Patent: Jun. 12, 2012

(54) SALAD MIXING APPARATUS

(76) Inventors: Candice Hudson, Cave Creek, AZ (US); Dale Hudson, Cave Creek, AZ (US)

( * ) Notice: Subject to any disclaimer, the term of this patent is extended or adjusted under 35 U.S.C. 154(b) by 433 days.

(21) Appl. No.: 12/423,892

(22) Filed: Apr. 15, 2009

(65) Prior Publication Data

US 2010/0265790 A1 Oct. 21, 2010

(51) Int. Cl.
*B01F 11/00* (2006.01)

(52) U.S. Cl. ........ 366/218; 366/244; 366/129; 366/130; 366/220; 366/225; 366/228; 220/4.25; 220/533; 220/552

(58) Field of Classification Search .................. 366/218, 366/244, 129, 130, 220, 225, 228, 147; 220/4.25, 220/533, 552
See application file for complete search history.

(56) References Cited

U.S. PATENT DOCUMENTS 3,081,070 A 3/1962 Welsch
D450,219 S 11/2001 Smith
6,378,325 B1 * 4/2002 Yang ............................ 62/457.6
7,080,463 B1 7/2006 Johnson

* cited by examiner

*Primary Examiner* — Yogendra Gupta
*Assistant Examiner* — Ninh Le
(74) *Attorney, Agent, or Firm* — Dale J. Ream

(57) ABSTRACT

A salad mixing apparatus includes a first bowl having an inner surface, an interior area, and a plurality of mixing ribs in the first bowl interior area and at least one partition configured for removable attachment to the mixing ribs to form a plurality of compartments. The apparatus includes a lid extending across the partitions whereby the inner surface, the at least one partition, and the lid selectively enclose the plurality of compartments. A second bowl having an interior area is configured for selective attachment to the first bowl whereby the first bowl interior area and the second bowl interior area collectively form a unitary interior area when the at least one partition is separated from the mixing ribs and the second bowl is attached to the first bowl.

11 Claims, 9 Drawing Sheets

SALAD MIXING APPARATUS

BACKGROUND OF THE INVENTION

This invention relates generally to food preparation devices and, more particularly, to an apparatus for mixing salad that enables selected ingredients to be separated from other selected ingredients until their mixture is desired.

In mixing a salad together, it is sometimes difficult to neatly mix the ingredients together. Another problem with mixing salads is that some ingredients should not be added until just before the salad is served so that they do not become soggy or otherwise lose their natural freshness or taste.

Various devices have been proposed in the art for neatly mixing salad ingredients, such as devices having handles and that are rotatable so as to mix ingredients placed inside. Although these devices and proposals are assumably effective for their intended purposes, they are somewhat ineffective at keeping a selected group of ingredients separate from another group of ingredients until a desired serving time as well as also being useful as a serving bowl.

Therefore, it would be desirable to have a salad mixing apparatus that can hold one or more sets of ingredients separate from another until just prior to serving. Further, it would be desirable to have a salad mixing apparatus that is useful for thoroughly mixing salad ingredients and that also is useful as a serving bowl.

SUMMARY OF THE INVENTION

Therefore, a salad mixing apparatus according to the present invention includes a first bowl having an inner surface, an interior area, and a plurality of mixing ribs in the first bowl interior area and at least one partition configured for removable attachment to the mixing ribs to form a plurality of compartments. The apparatus includes a lid extending across the partitions whereby the inner surface, the at least one partition, and the lid selectively enclose the plurality of compartments. A second bowl having an interior area is configured for selective attachment to the first bowl whereby the first bowl interior area and the second bowl interior area collectively form a unitary interior area when the at least one partition is separated from the mixing ribs and the second bowl is attached to the first bowl.

Therefore, a general object of this invention is to provide a salad mixing apparatus for thoroughly mixing salad ingredients.

Another object of this invention is to provide a salad mixing apparatus, as aforesaid, that selectively separates at least one ingredient from at least another ingredient until their mixture is desired.

Still another object of this invention is to provide a salad mixing apparatus, as aforesaid, that may be coupled to a base for rotation using a crank.

Yet another object of this invention is to provide a salad mixing apparatus, as aforesaid, that is user friendly and cost effective.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

A salad mixing apparatus will now be described in detail with reference to FIG. 1 through FIG. 9 of the accompanying drawings. More particularly, a salad mixing apparatus 100 of one embodiment includes a first housing (often referred to herein as the first "bowl") 110 and at least one complementary housing 200.

Figure 1:
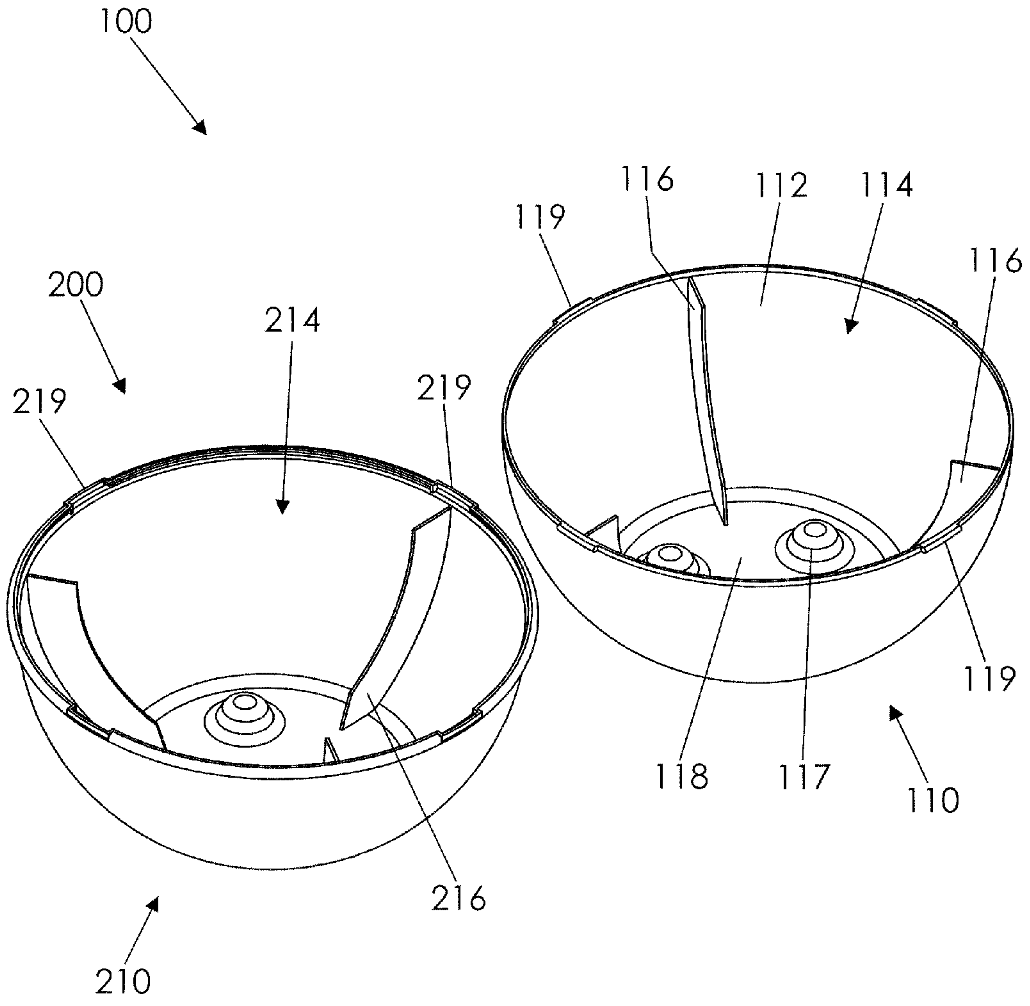
FIG. 1 is a perspective view of a salad mixing apparatus according to a preferred embodiment of the present invention.
Figure 2:
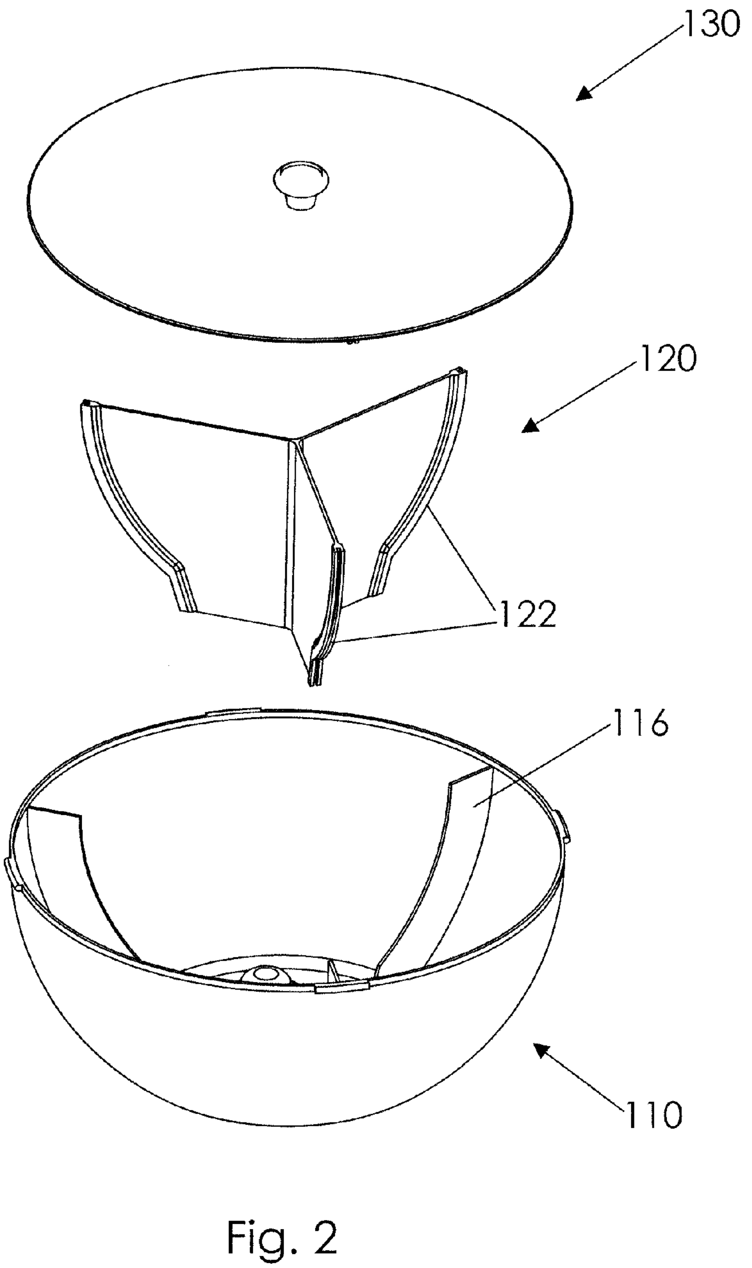
FIG. 2 is an exploded view of a first bowl, partition, and lid.

As shown in FIG. 1, the first bowl 110 has an inner surface 112, an interior area 114, a plurality of mixing ribs 116 in the interior area 114, and a bottom side 118. The first bowl 110 may be constructed of metal, glass, plastic, and/or other materials. Turning to FIG. 2, at least one partition 120 is configured to be removably attached to the mixing ribs 116 to form a plurality of compartments. For example, receiving members 122 on the partition(s) 120 may receive the ribs 116 such that the partition(s) 120 may be slid onto the mixing ribs 116 to form the compartments. While three partitions 120 are shown in FIG. 2, it should be understood that any desirable number of partitions may be used.

A lid 130 (FIG. 2) may extend across the partition(s) such that the inner surface 112, the partition(s) 120, and the lid 130 may enclose the compartments. The lid 130 may be removably coupled to the partition(s) 120 (e.g., by clips or other appropriate fasteners) or permanently attached to the partition(s) 120. In some embodiments, the enclosed compartments are substantially watertight.

Figure 3:
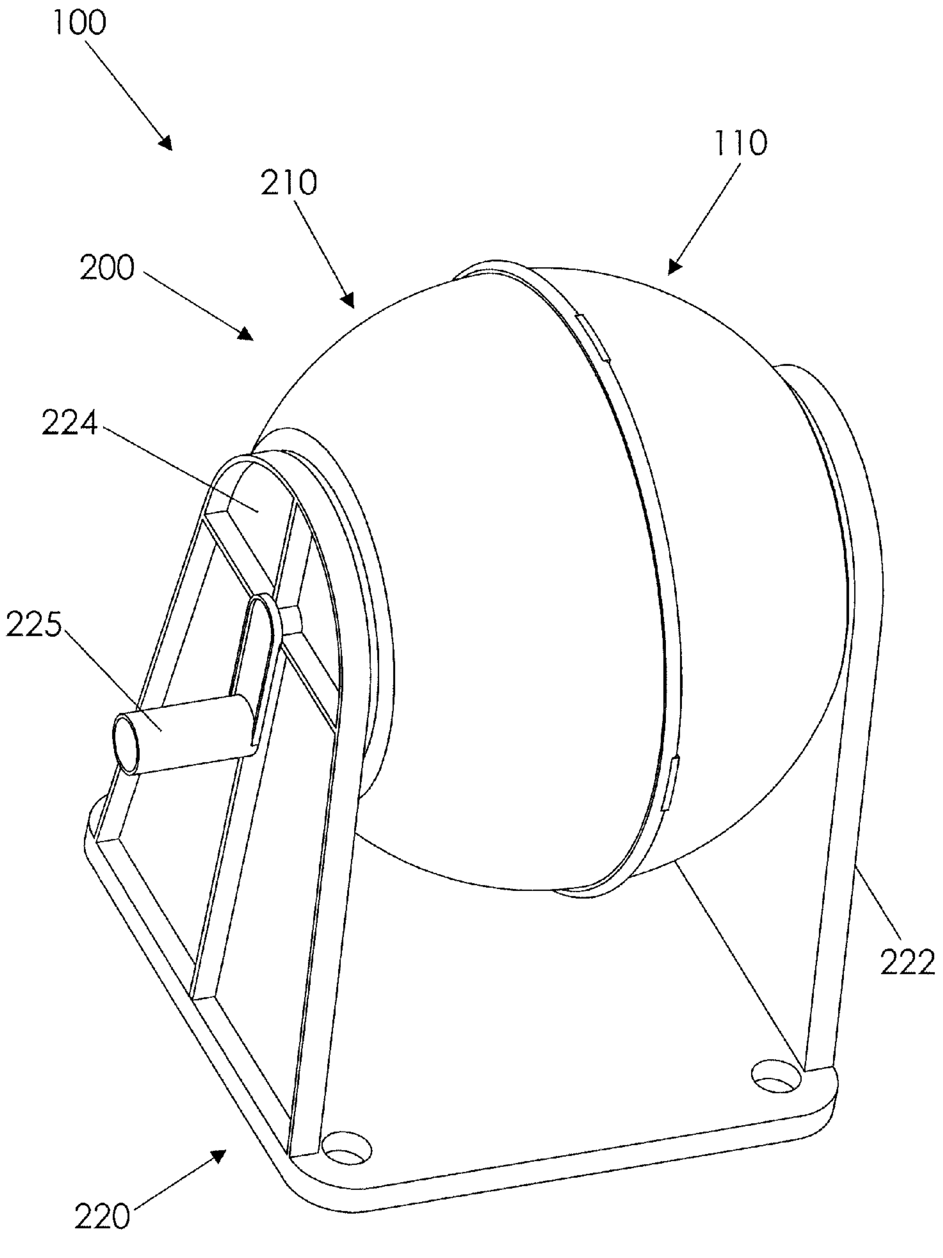
FIG. 3 is a perspective view of the salad mixing apparatus mounted to a base.
Figure 4:
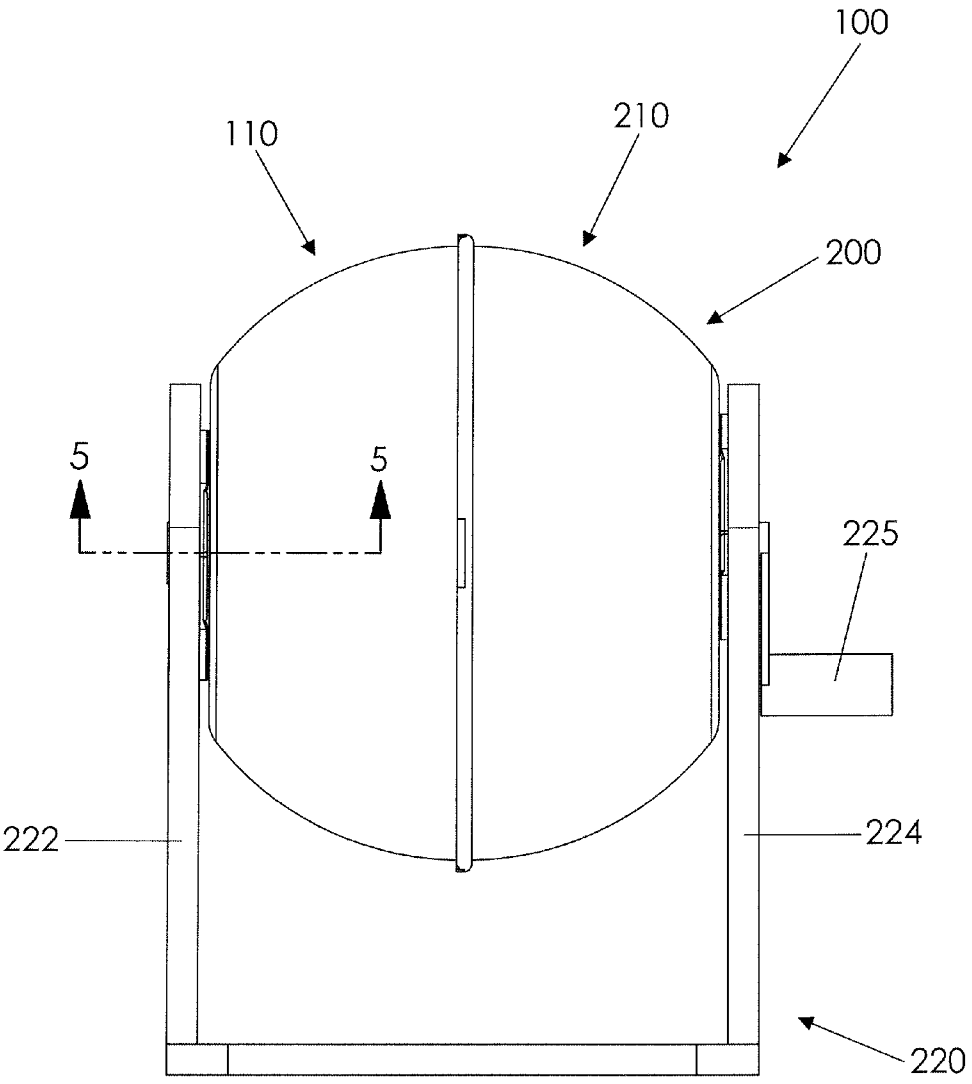
FIG. 4 is a front view of the salad mixing apparatus as in FIG. 4.
Figure 5:
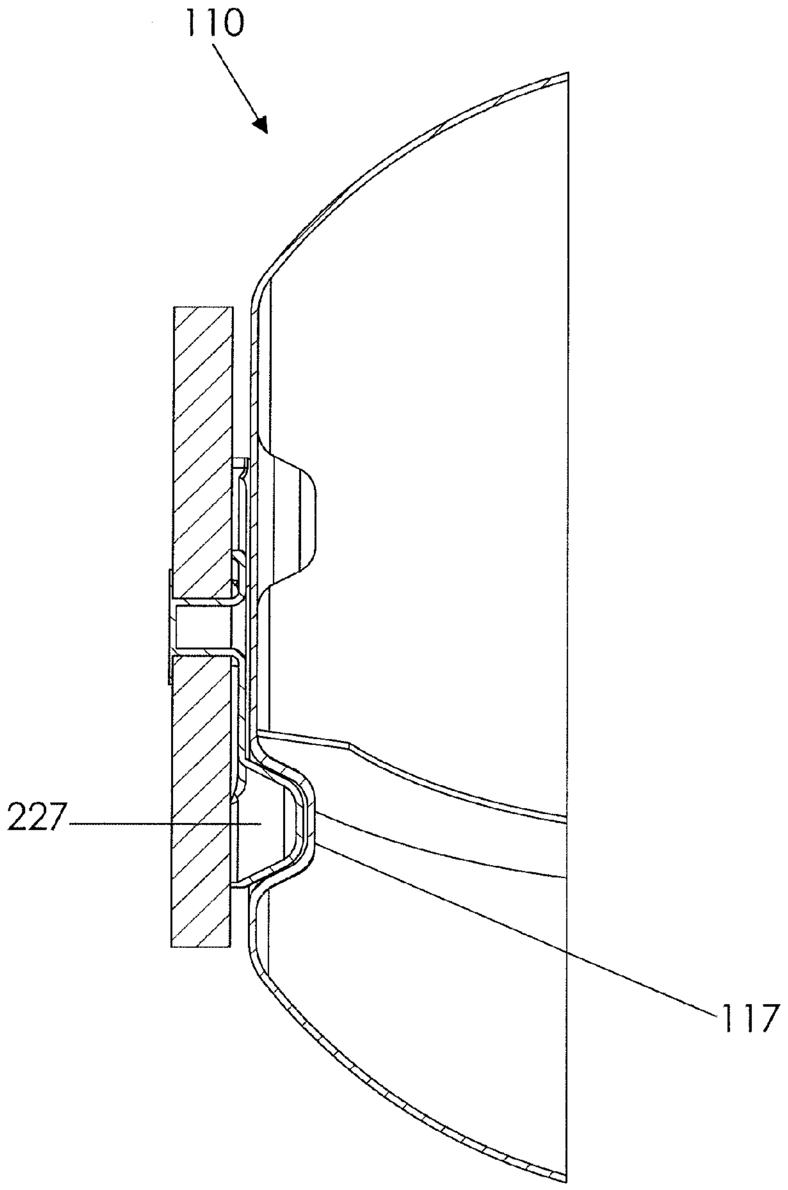
FIG. 5 is a sectional view taken along line 5-5 of FIG. 4.

One complementary housing 200 is shown in FIGS. 1, 3, and 4 and referred to as complementary bowl (also referred to as a "second bowl" or complementary bowl) 210. Another complementary housing 200 is shown in FIGS. 6 through 9 and referred to as another complementary bowl (also referred to as a "third bowl" or another complementary bowl) 230. Each is described in turn, and it should be understood that either housing 200, or both housings 200, i.e, the second 210 and third 230 bowls, may be included in the salad mixing apparatus 100.

As shows in FIGS. 1 and 3, the complementary bowl 210 has an interior area 214 and is configured to be selectively attached to the first bowl 110 such that the interior area 114 of the first bowl 110 and the interior area 214 of the complementary bowl 210 collectively form a unitary interior area when the partition(s) 120 are separated from the mixing ribs 116 and the complementary bowl 210 is attached to the first bowl 110. Snap locking members 219, 119, rotating locks, or any other appropriate fasteners may be used to couple the complementary bowl 210 to the first bowl 110. Similar to the first bowl 110, the complementary bowl 210 may include mixing ribs 216, and a lid similar to the lid 130 may be included. As such, the complementary bowl 210 may have enclosed compartments similar to those in the first bowl 110.

A base 220 may be included for receiving the first bowl 110 and the complementary bowl 210 to mix the contents of the unitary interior area, as shown in FIG. 3 and FIG. 4. The base 220 has means for rotating the first bowl 110 and the complementary bowl 210. In some embodiments, for example, the base 220 has first and second arms 222, 224 for respectively interacting with the first bowl 110 and the complementary bowl 210 to allow the bowls 110, 210 to rotate, and the base 220 has a crank 225 for selectively rotating the bowls 110, 210. As detailed in FIG. 5, for example, interaction between protrusions 227 and cavities 117 may couple the base 220 to the bowls 110, 210.

Figure 7A:
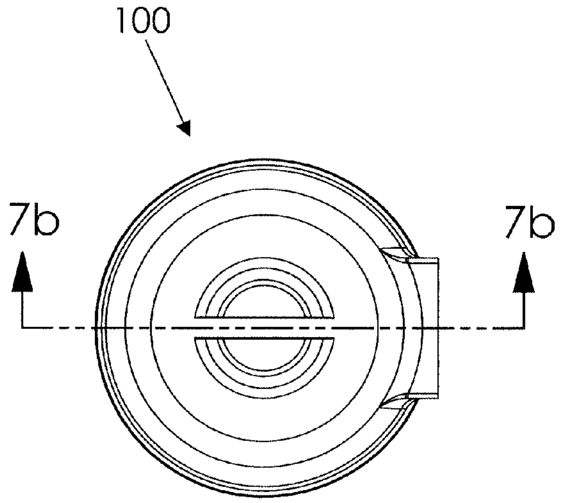
FIG. 7*a* is a top view of the cover mounted to the complementary bowl as in FIG. 6.
Figure 7B:
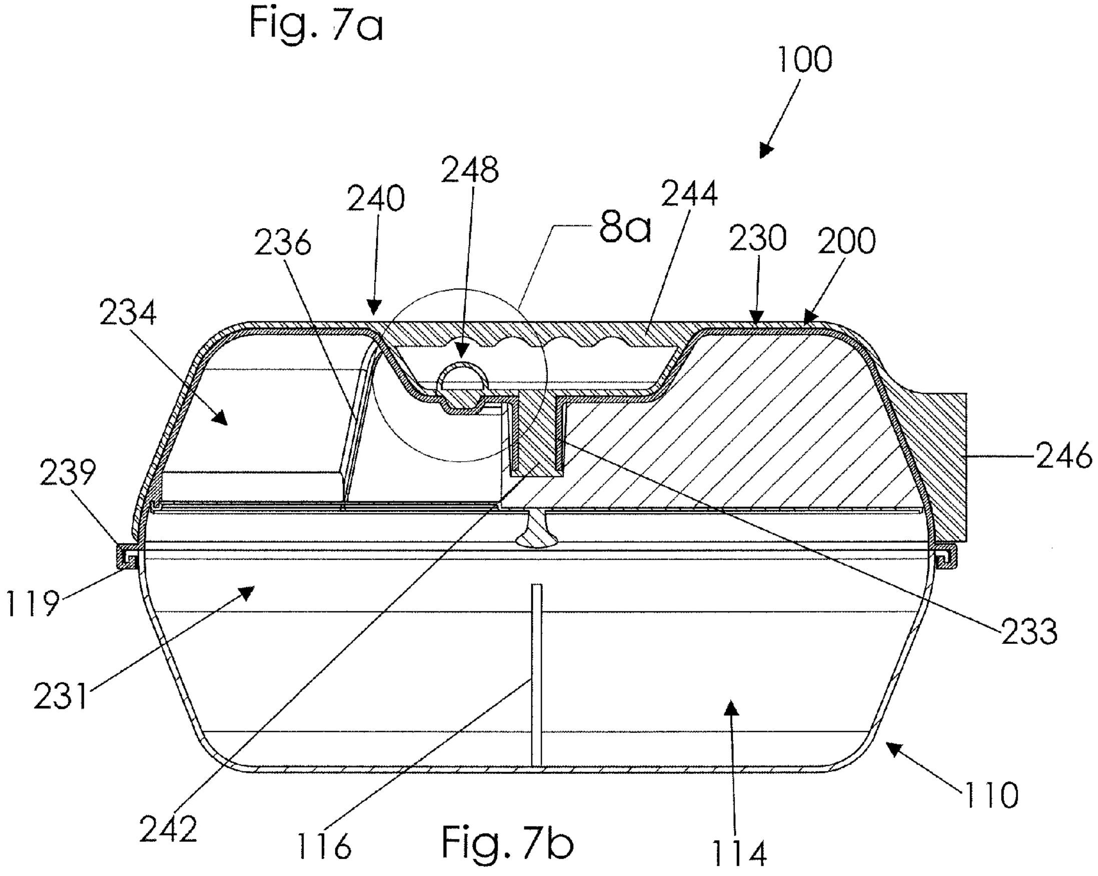
FIG. 7*b* is a sectional view taken along line 7*a*-7*a* of FIG. 7*b;*
Figure 8A:
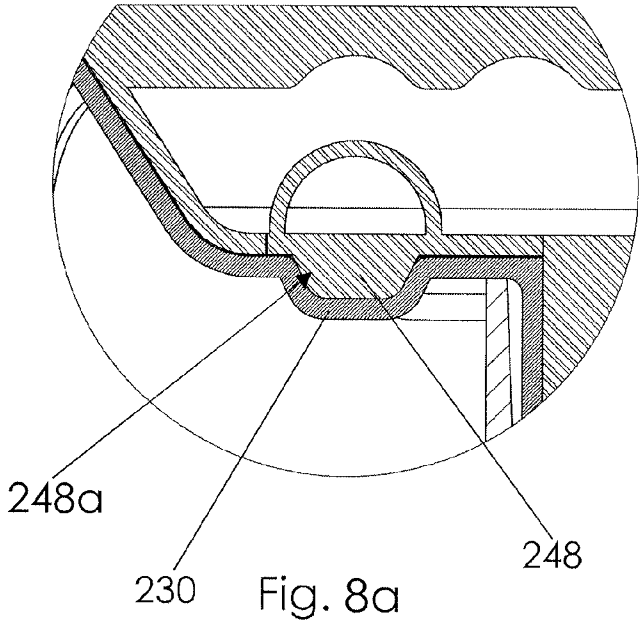
FIG. 8*a* is an isolated view on an enlarged scale taken from FIG. 7*b* with a lock in a first position.
Figure 8B:
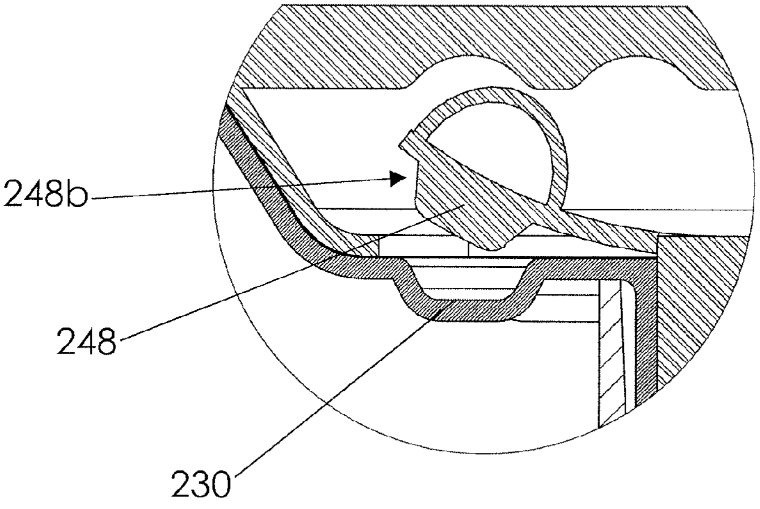
FIG. 8*b* is an isolated view on an enlarged scale taken from FIG. 7*b* with a lock in a second position.

Turning to the other complementary housing 200, as shown in FIG. 7*b*, the complementary bowl 230 has an interior area 234 and is configured to be selectively attached to the first bowl 110 such that the interior area 114 of the first bowl 110 and the interior area 234 of the complementary bowl 230 collectively form a unitary interior area 231 when the partition(s) 120 are separated from the mixing ribs 116 and the complementary bowl 230 is attached to the first bowl 110. Snap locking members 239, 119, rotating locks, or any other appropriate fasteners may be used to couple the complementary bowl 230 to the first bowl 110. Similar to the first bowl 110, the complementary bowl 230 may include mixing ribs 236 (FIG. 7*b*), and a lid similar to the lid 130 may be included. As such, the complementary bowl 230 may have enclosed compartments similar to those in the first bowl 110.

Figure 6:
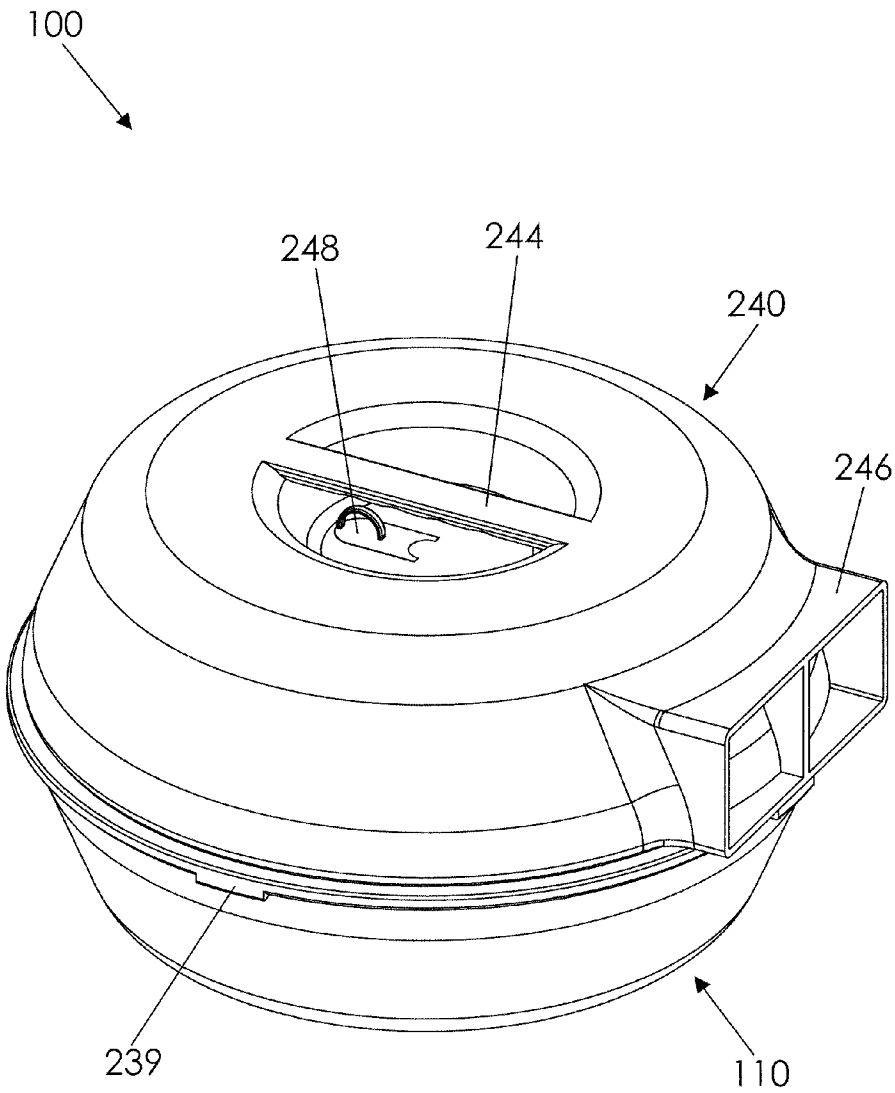
FIG. 6 is a perspective view of a cover mounted to the complementary bowl.
Figure 9:
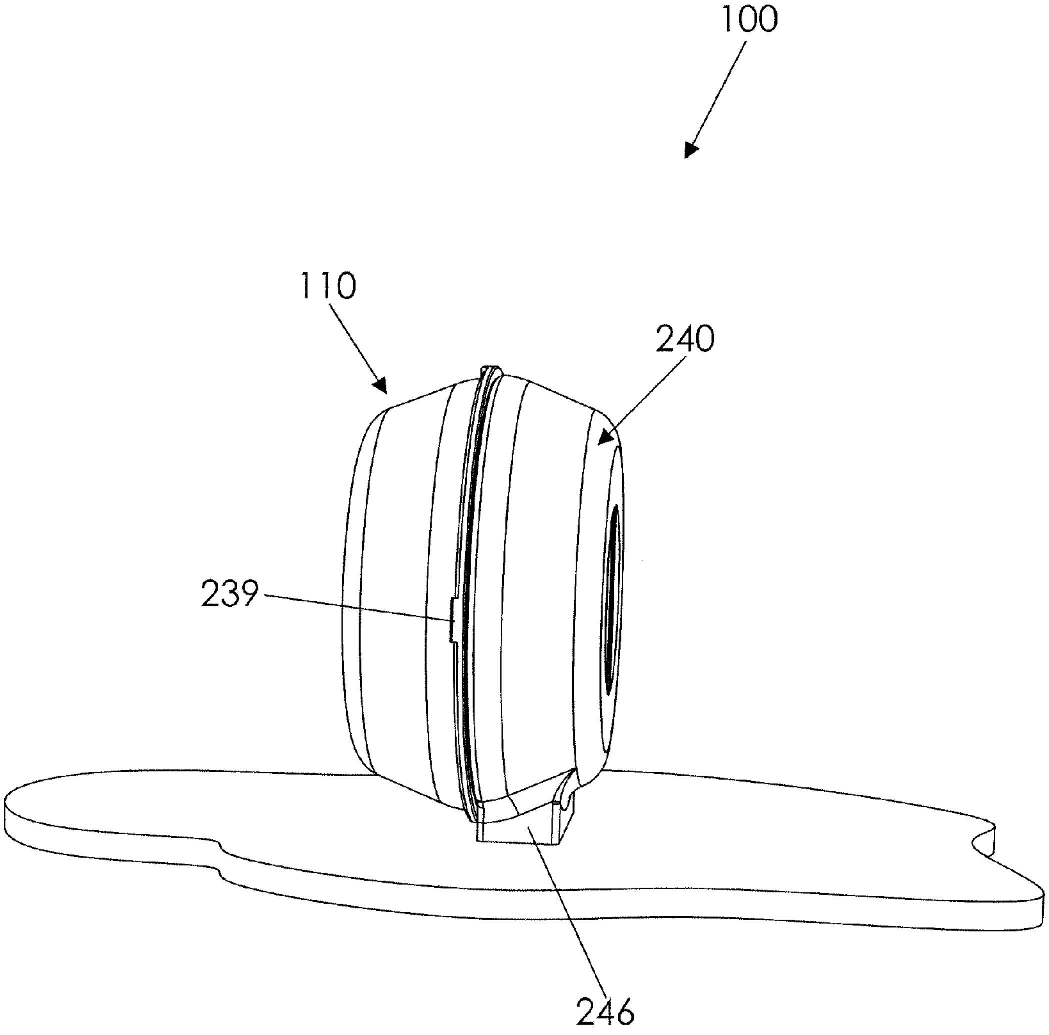
FIG. 9 is a perspective view of the salad mixing apparatus including cover situated on its side.

A cover 240 (FIGS. 6 through 9) is rotatably coupled to the complementary bowl 230 such that the continuous interior area 231 is rotatable relative to the cover 240. While various coupling mechanisms may be used, FIG. 7*b* shows a shaft 242 passing through a channel 233 and rotatably anchoring the cover 240 to the complementary bowl 230. The cover 240 may include a handle 244 (FIGS. 6 and 7*b*) and may include a stand 246 (FIGS. 6, 7*b*, and 9). The stand 246 may be configured to rest the cover 240 on a generally planar surface while the bottom side 118 is generally vertical. As shown in FIG. 7*b* through FIG. 8*b*, a lock 248 may be adjacent the handle 244. The lock 248 may be movable between a first position 248*a* (FIG. 8*a*) interacting with the complementary bowl 230 to restrain the complementary bowl 230 from rotating relative to the cover 240 and a second position 248*b* (FIG. 8*b*) separated from the complementary bowl 230 to allow the complementary bowl 230 to rotate relative to the cover 240.

In use, various salad ingredients may be placed in the compartments of the first bowl 110 and enclosed by the inner surface 112, the partition(s) 120, and the lid 130. As such, the various ingredients may be separated from one another for storage purposes until time for mixing. If the complementary housing 200 has similar compartments, ingredients may also be isolated in the complementary housing 200. When desired, such as shortly before serving, the partition(s) 120 and lid 130 may be removed from the first bowl 110 (and any similar partitions may be removed from the complementary housing 200), and the first bowl 110 may be coupled to the complementary housing 200. As shown in FIGS. 1 and 3, if the complementary bowl 210 is used, the snap locking members 219, 119 may couple the complementary bowl 210 to the first bowl 110 so that the interior areas 114, 214 collectively form a unitary interior area; as shown in FIGS. 6 and 7*b*, if the complementary bowl 230 is used, the snap locking members 239, 119 may couple the complementary bowl 230 to the first bowl 110 so that the interior areas 114, 234 collectively form a unitary area. Once the ingredients are mixed, as discussed below, the first bowl 110 may be separated from the complementary housing 200, and the salad may be served in the first bowl 110 or another bowl.

The complementary bowls 210, 230 differ primarily in the manner in which they facilitate mixing. If both complementary housings 200 are available for use, the user may determine which shall be used at any given time based on how mixing is desired to be performed. For the complementary bowl 210, the first bowl 110 and the complementary bowl 210 may be received by the base 220, as set forth above, and the crank 225 may be used to rotate the bowls 110, 210 (FIG. 3). The mixing ribs 116, 216 may facilitate mixing. For the complementary bowl 230, the user may hold the handle 244 of the cover 240, and the stand 246 may be placed on a stationary surface (FIG. 9). The lock 248 may be moved to the release position 248*b* (FIG. 8*b*), and the user may manually rotate the bowls 110, 230 relative to the cover 240. The mixing ribs 116, 236 may facilitate mixing. Since the complementary bowl 230 does not require use of the base 220, the complementary bowl 230 may be preferable for applications in which transportation will be required or counter space is not available.

It is understood that while certain forms of this invention have been illustrated and described, it is not limited thereto except insofar as such limitations are included in the following claims and allowable functional equivalents thereof.

The invention claimed is:

1. A salad mixing system, comprising:

a first bowl having an inner surface, an interior area, and a plurality of mixing ribs in said first bowl interior area;

at least one partition configured for removable attachment to said mixing ribs to form a plurality of compartments;

a lid extending across said partitions whereby said inner surface, said at least one partition, and said lid selectively enclose said plurality of compartments;

a second bowl having an interior area and being configured for selective attachment to said first bowl whereby said first bowl interior area and said second bowl interior area collectively form a unitary interior area when said at least one partition is separated from said mixing ribs and said second bowl is attached to said first bowl;

a base for selectively receiving said first and second bowls to mix contents of said unitary interior area, said base having first and second arms for respectively interacting with said first and second bowls to allow said first and second bowls to rotate, said base having a crank for selectively rotating said first and second bowls;

a third bowl having an interior area and being configured for selective attachment to said first bowl whereby said first bowl interior area and said third bowl interior area form a continuous interior area when said at least one partition is separated from said mixing ribs and said third bowl is attached to said first bowl; and a cover rotatably coupled to said third bowl such that said continuous interior area is rotatable relative to said cover, said cover having a handle.

2. The system of claim 1, wherein said enclosed compartments are substantially watertight compartments.

3. The system of claim 2, wherein said lid is removably coupled to said at least one partition.

4. The system of claim 1, further comprising a base for receiving said first and second bowls to mix contents of said unitary interior area, said base having means for rotating said first and second bowls.

5. The system of claim 1, wherein:

said first bowl has a bottom side; and said cover includes a stand configured to rest said cover on a generally planar surface while said bottom side is generally vertical.

6. The system of claim 5, wherein said cover includes a lock adjacent said handle, said lock being movable between a first position interacting with said third bowl to restrain said third bowl from rotating relative to said cover and a second position separated from said third bowl to allow said third bowl to rotate relative to said cover.

7. The system of claim 6, wherein:

said enclosed compartments are substantially watertight compartments; and said lid is removably coupled to said at least one partition.

8. The system of claim 1, wherein the cover rotatably configured for selectively coupling to said second bowl such that said unitary interior area is rotatable relative to said cover, said cover having a handle.

9. The system 8, wherein:

said first bowl has a bottom side; and said cover includes a stand configured to rest said cover on a generally planar surface while said bottom side is generally vertical.

10. The system of claim 9, wherein said cover includes a lock adjacent said handle, said lock being movable between a first position interacting with said second bowl to restrain said second bowl from rotating relative to said cover and a second position separated from said second bowl to allow said second bowl to rotate relative to said cover.

11. The system of claim 10, wherein:

said enclosed compartments are substantially watertight compartments; and said lid is removably coupled to said at least one partition.

* * * * *